United States Patent [19]
Wilks

[11] Patent Number: 5,855,542
[45] Date of Patent: Jan. 5, 1999

[54] FISHING DEVICE

[76] Inventor: Ronald Casey Wilks, 2749 North Haven, Apt. 4079, Dallas, Tex. 75229

[21] Appl. No.: 556,167

[22] Filed: Nov. 9, 1995

[51] Int. Cl.⁶ .................................................... A01K 97/12
[52] U.S. Cl. ................................. 493/15; 493/16; 493/25
[58] Field of Search ..................................... 43/15, 16, 25

[56] References Cited

U.S. PATENT DOCUMENTS

| | | | |
|---|---|---|---|
| 4,026,058 | 5/1977 | Harris | 43/15 |
| 4,124,948 | 11/1978 | Mautner | 43/15 |
| 4,393,615 | 7/1983 | Hodshire | 43/15 |
| 4,453,331 | 6/1984 | Whetstone, Sr. | 43/15 |
| 4,924,617 | 5/1990 | Parent | 43/15 |
| 5,363,582 | 11/1994 | Walker et al. | 43/15 |

*Primary Examiner*—Joseph J. Hail, III
*Assistant Examiner*—Darren Ark

[57] ABSTRACT

The improved fishing device including a first jaw. The first jaw has a first upper portion with a projection, a first lower portion with a projection and a first intermediate with a projection and a hooking portion. Included is a second jaw. The second jaw has a second upper portion with a projection, a second lower portion with a fork projection having apertures therethrough and a second intermediate with a hooking portion. The second upper portion is capable of coupling with the first upper portion. The second lower portion has a bore within. Also included is a swing-arm with a front end being positioned within the second jaw and a rear end coupled to the first jaw. A rubber band for attaching to each hooking portion is provided. Included is a clamp coupled to the first lower portion of the first jaw. A lever with a bolt attached that is capable of having a fishing line is placed thereon. Lastly, a cam is positioned within the fork and has a rod capable of moving the swing-arm.

15 Claims, 4 Drawing Sheets

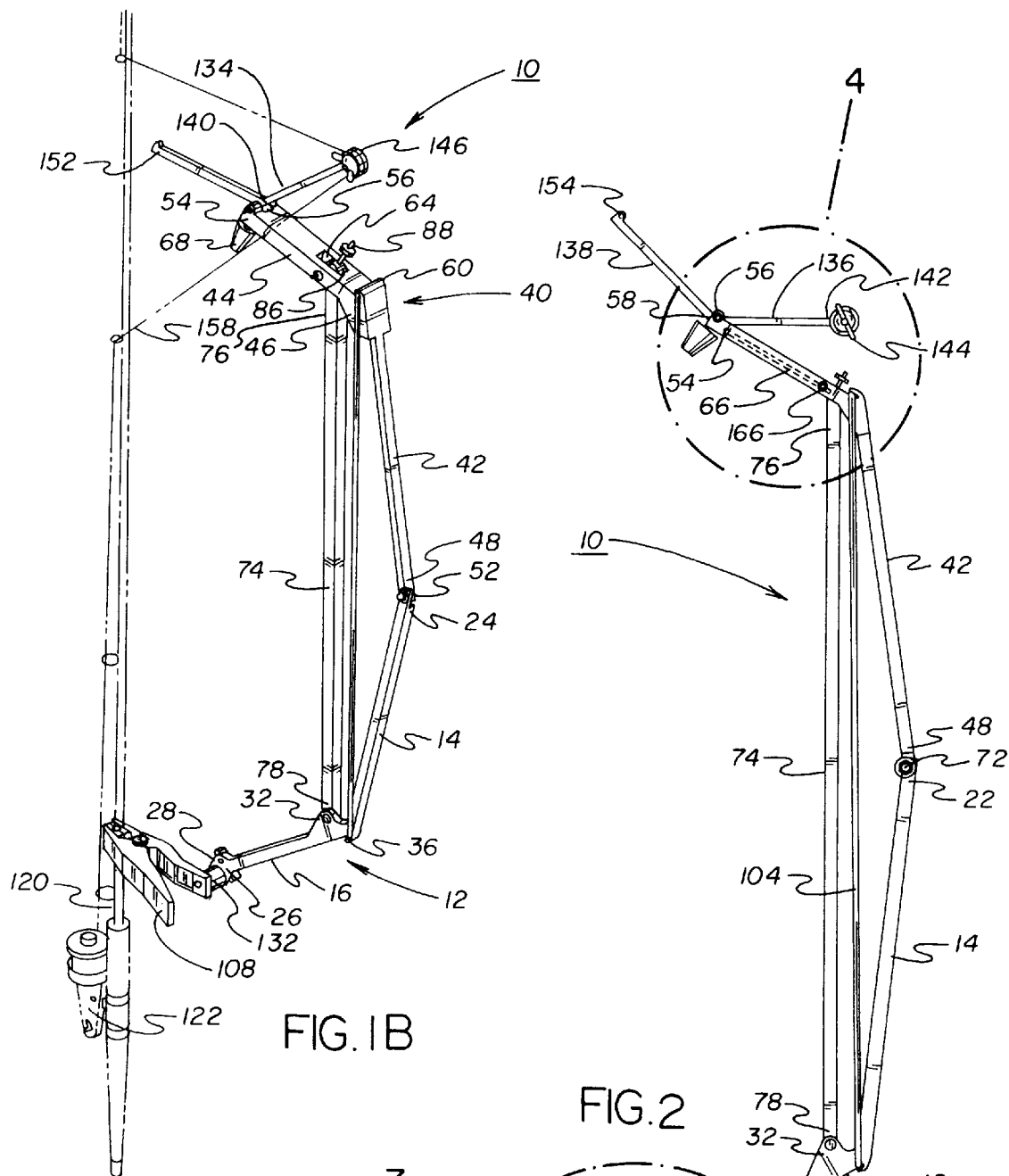

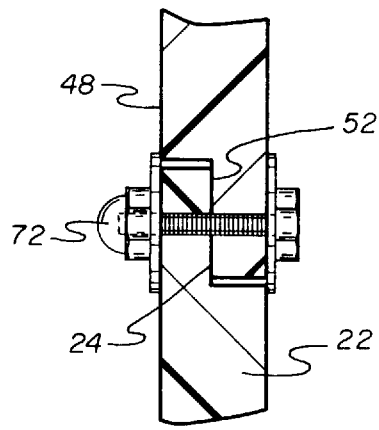
FIG. 5
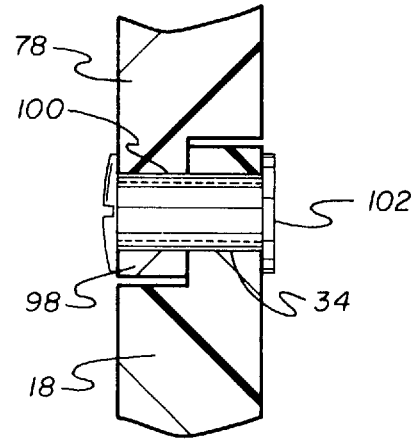
FIG. 6
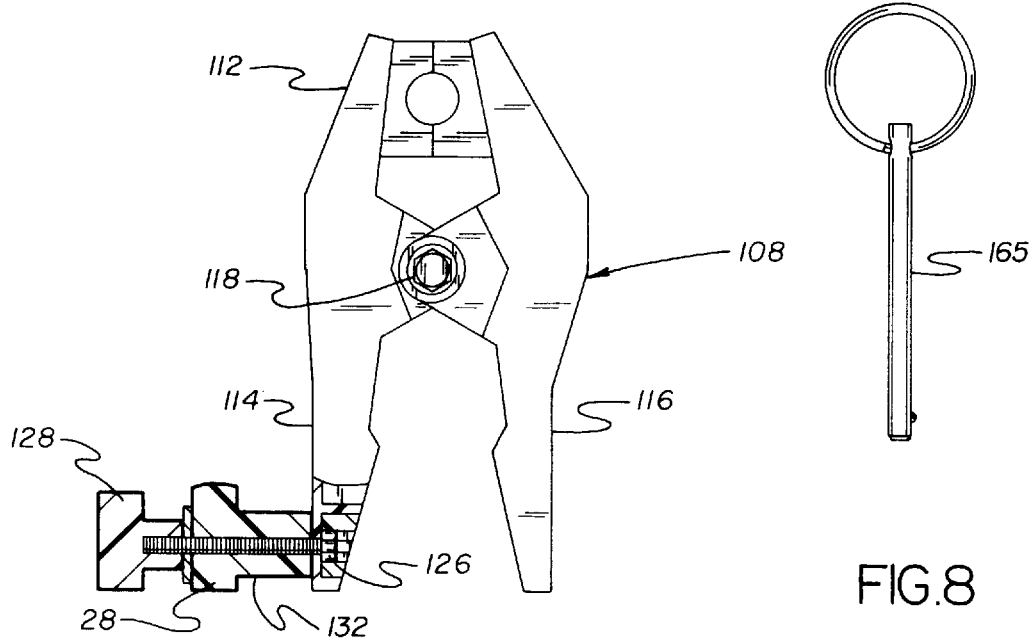
FIG. 7
FIG. 8

FISHING DEVICE

BACKGROUND OF THE INVENTION

1. Field of the Invention

The present invention relates to an improved fishing device and more particularly pertains to allowing fish to be hooked when the second jaw is caused to rotate toward the first jaw when the lever in which the line is attached is rotated outwardly by the fish biting the bait, and further increasing the likelihood of hooking a fish when the fishing device is attached to a standard fishing rod.

2. Description of the Prior Art

The use of fishing devices is known in the prior art. More specifically, fishing devices heretofore devised and utilized for the purpose of hooking fish when the device is used on a fishing pole are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,924,617 to Parent discloses a hook setting device. U.S. Pat. No. 4,453,331 to Whetstone discloses a fishhook setting trigger. U.S. Pat. No. 3,852,905 to Webb discloses a fish hook embedding device. Lastly, U.S. Pat. No. 1,475,408 to Reed discloses a fishing tackle.

While these devices fulfill their respective, particular objectives and requirements, the aforementioned patents do not describe an improved fishing device that has a first and second jaw that is expanded by a swing-arm and can be retracted by a lever pushing a rod against a projection of the swing-arm to release the arm and setting the hook into the fish by pulling the fishing line tight.

In this respect, the improved fishing device according to the present invention substantially departs from the conventional concepts and designs of the prior art, and in doing so provides an apparatus primarily developed for the purpose of allowing fish to be hooked when the second jaw is caused to rotate toward the first jaw when the lever in which the line is attached is rotated outward by the fish biting the bait, and further increasing the likelihood of hooking a fish when the fishing device is attached to a standard fishing rod.

Therefore, it can be appreciated that there exists a continuing need for a new and improved fishing device which can be used for allowing fish to be hooked when the second jaw is caused to rotate toward the first jaw when the lever in which the line is attached is rotated outward by the fish biting the bait, and further increasing the likelihood of hooking a fish when the fishing device is attached to a standard fishing rod. In this regard, the present invention substantially fulfills this need.

SUMMARY OF THE INVENTION

In view of the foregoing disadvantages inherent in the known types of fishing devices now present in the prior art, the present invention provides an improved fishing device. As such, the general purpose of the present invention, which will be described subsequently in greater detail, is to provide a new and improved fishing device and method which has all the advantages of the prior art and none of the disadvantages.

To attain this, the present invention essentially comprises, in combination a first jaw. The first jaw has a first upper portion, a first lower portion and a first intermediate. The first upper portion has a length of about 1 foot. The first upper portion has a front end with a rectangular projection and a back end integral the intermediate. The rectangular projection has an opening therethrough. The first lower portion is at an angle to the first lower portion and has a length of about 6 inches. The first lower portion has a top end integral the first intermediate and a bottom end with a rounded projection extending therefrom. The rounded projection has an opening therethrough. The first intermediate has a front side and a back side. The front side has a rounded projection with an opening therein extending outwardly and the back side has a hooking portion. Also included is a second jaw. The second jaw has a second upper portion, a second lower portion and a second intermediate. The second upper portion has a length of about 1 foot. The second upper portion has a back end with a rectangular projection and a front end integral the second intermediate. The rectangular projection has an opening therethrough. The second lower portion is at an angle to the second upper portion and has a length of about 6 inches. The second lower portion has a top end integral the second intermediate and a bottom end with a fork projection extending therefrom. The fork projection has two extents with each extent of the fork having a horizontal aperture therethrough. Each aperture of each extent of the fork is axial and collinear. The second intermediate has a front side and a back side. The front side has a hooking portion. The second lower portion has a generally rectangular hole spaced from the bottom end and adjacent the top end. The second lower portion further has a longitudinal bore therein. The bore extends from the bottom end into the hole. The rectangular projection of the back end of the second upper portion is coupled with a nut and bolt to the rectangular projection of the front end of the first upper portion. The nut and bolt are positioned through the opening of each rectangular projection. Included is a swing-arm with a front end, a rear end and a length of about 22 inches from the front end to the rear end. The front end has a rounded projection extending therefrom with an opening therethrough. The rounded projection of the swing-arm has a top side with an end stop therein and projecting outwardly therefrom. The rounded projection of the swing-arm has a bottom side with a wear resistant insert therein. The rounded projection of the swing-arm is capable of resting within the rectangular hole of the lower portion of the second jaw. The rear end has a generally rectangular projection with an opening therethrough. The rectangular projection of the swing-arm is coupled by a rivet to the rounded projection of the front side of the first intermediate. A rubber band is provided and is hooked to the hook of the first jaw and the second jaw. A clamp is included. The clamp has a mouth, a pair of grips and a pivot pin with a bias member therebetween. The mouth is capable of clasping onto a portion of a fishing rod above a reel. One of the pair of grips has a threaded opening therethrough. The one grip is coupled to the rounded projection of the first lower portion with a ratchet mechanism. The ratchet mechanism is positioned through the opening of the projection of the first lower portion and threaded through the opening of the one grip. Furthermore a lever is provided. The lever has a first portion, a second portion and a joining point therebetween. The first portion forms an obtuse angle with the second portion at the joining point. The first portion has a first end with a wing nut therethrough. The wing nut has a bolt attached thereto. The second portion has a second end with an eyelet therethrough. The joining point has an opening therethrough. The lever is attached to the fork of the second jaw. The bolt is capable of having a portion of a fishing line placed thereon after the clamp is attached to a fishing rod. The fishing line has a hook thereon. Lastly, a cam is included. The cam is positioned between the fork of the second jaw and adjacent the opening of the joining point of the lever. The cam can be part of the lever. The cam has extending therefrom a rod. The rod is positioned within the bore of the second jaw when the cam is positioned between the fork. The cam is secured within the fork with a pivot pin. The swing-arm, when the device is set, rests on a locking pin positioned axially in the lower portion of the rectangular hole within the second jaw. The rod rests against a wear resistant insert, preferably a metal piece. The cam is capable of moving the rod in a downward motion for release of the swing-arm when the lever is pulled forward by a fish pulling the fishing line positioned attached to the bolt. The swing-arm is released and allows the rubber band to retract forcing the second jaw to move toward the first jaw, thereby pulling the fish hook into the fish as the fishing line is pulled by the device.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved fishing device which has all of the advantages of the prior art fishing devices and none of the disadvantages.

It is another object of the present invention to provide a new and improved fishing device which is easy to use, safe and has a long stroke.

It is further object of the present invention to provide a new and improved fishing device which is of durable and reliable constructions.

An even further object of the present invention is to provide a new and improved fishing device which provides for ease of use by the user.

Still yet another object of the present invention is to provide a new and improved fishing device which provides in the apparatuses and methods of the prior art some of the advantages thereof, while simultaneously overcoming some of the disadvantages normally associated therewith.

Even still another object of the present invention is to provide an improved fishing device for allowing fish to be hooked when the second jaw is caused to rotate toward the first jaw when the lever in which the line is attached is rotated outward by the fish biting the bait, and further increasing the likelihood of hooking a fish when the fishing device is attached to a standard fishing rod.

Lastly, it is an object of the present invention to provide a new and improved fishing device comprising a first jaw. The first jaw has a first upper portion with a projection, a first lower portion with a projection and a first intermediate with a projection and a hooking portion. The first intermediate is integral the first upper portion and the first lower portion. Each projection has an opening therethrough. Also included is a second jaw. The second jaw has a second upper portion with a projection, a second lower portion with a fork projection having apertures therethrough and a second intermediate with a hooking portion. The second intermediate is integral the second upper portion and the second lower portion. Each projection has an opening therethrough. The second upper portion is capable of coupling with the first upper portion. The second lower portion has a hole therethrough adjacent the second intermediate, and a bore within. A swing-arm is provided. The swing-arm has a front end being positioned within the second jaw and a rear end coupled to the first jaw. Included is a rubber band attached to each hooking portion. Furthermore a clamp is included. The clamp is coupled to the first lower portion of the first jaw and a fishing rod. A lever is included. The lever has a first portion with a bolt attached that is capable of having a fishing line placed thereon and a joining point for attaching to the fork. A cam has a rod for positioning within the bore. The cam is positioned within the fork. The rod is capable of moving the swing-arm from within the second jaw when the cam is rotated forward.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1B is a perspective view of the preferred embodiment of the improved fishing device in an operable configuration in accordance with the principles of the present invention.

FIG. 2 is a side elevational view of the present invention in an operable activated configuration.

FIG. 5 is an enlarged sectional view of the present invention at position 5 of FIG. 3.

FIG. 6 is an enlarged sectional view of the present invention at position 6 of FIG. 3.

FIG. 7 is an enlarged sectional view of the clamp as attached to the device at position 7 of FIG. 2.

FIG. 8 is an enlarged view of a safety pin for positioning in the device of FIG. 1.

The same reference numerals refer to the same parts through the various Figures.

DESCRIPTION OF THE PREFERRED EMBODIMENT

Figure 1A:
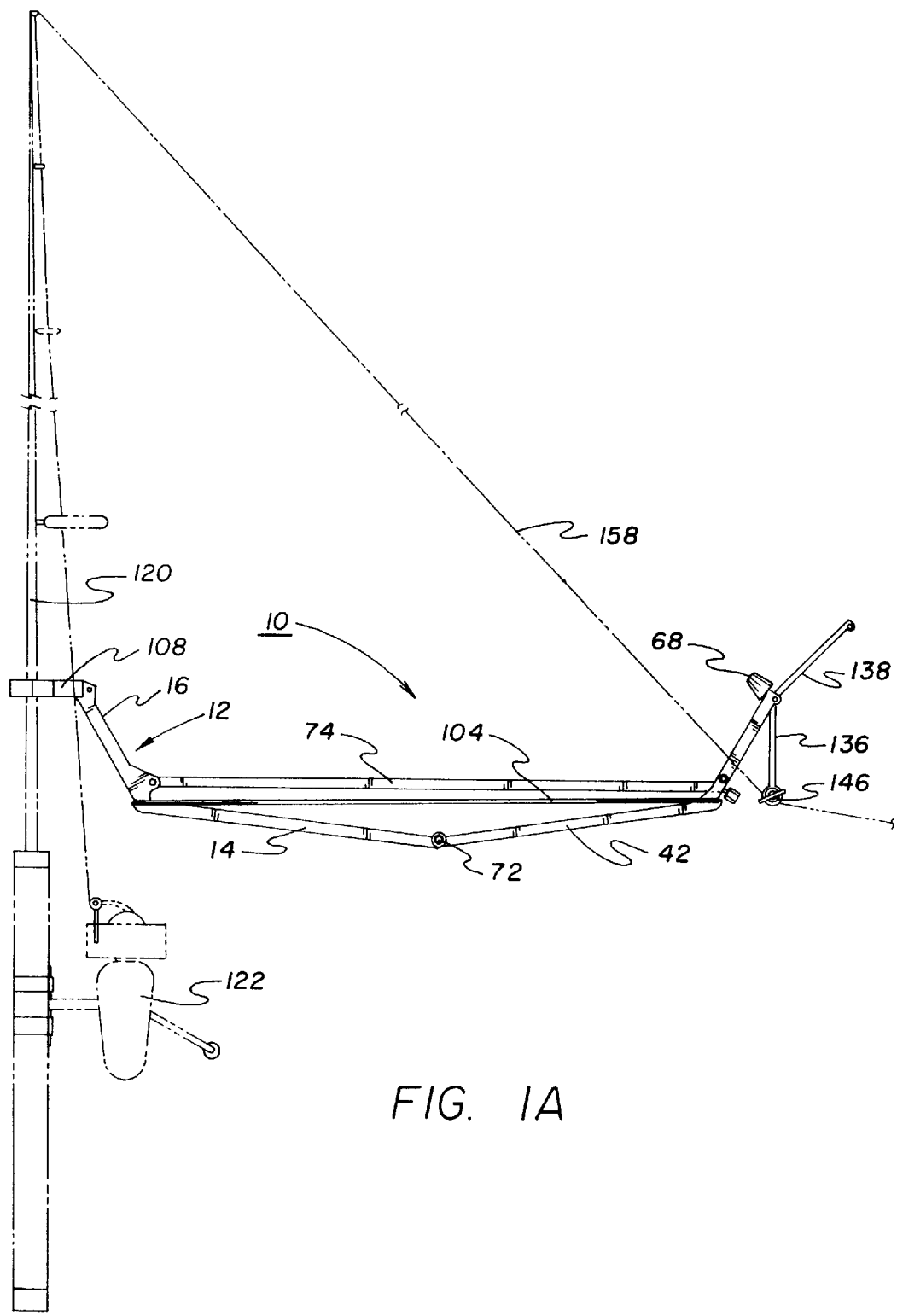
FIG. 1A is a perspective view of the preferred embodiment of the improved fishing device attached to the fishing pole at a 90 degree angle.

With reference now to the drawings, and in particular to FIG. 1B thereof, the preferred embodiment of the new and improved fishing device embodying the principles and concepts of the present invention and generally designated by the reference numeral 10 will be described.

The present invention, the improved fishing device 10 is comprised of a plurality of components. Such components in their broadest context include two jaws, a swing-arm, a lever, a rubber band and a clamp. Such components are individually configured and correlated with respect to each other so as to attain the desired objective.

Specifically, the present invention includes a first jaw 12. The first jaw has a first upper portion 14, a first lower portion 16 and a first intermediate 18, as shown in FIG. 1. The first jaw is formed of high density plastic. The first upper portion has a length of about 1 foot. The first upper portion has a front end 22 with a rectangular projection 24 and a back end integral the intermediate. The rectangular projection has an opening therethrough. The first lower portion 16 is at an angle to the first upper portion 14 and has a length of about 6 inches. The first lower portion has a top end integral the first intermediate and a bottom end 26 with a rounded projection 28 extending therefrom. The rounded projection 28 has an opening therethrough. The first intermediate has a front side and a back side. The front side has a rounded projection 32 extending outwardly, with an opening 34 therein, and the back side having a hooking portion 36.

As illustrated in FIG. 1B a second jaw 40 is included. The second jaw has a second upper portion 42, a second lower portion 44 and a second intermediate 46. The second upper portion is formed of high density plastic. The second upper portion has a length of about 1 foot. The second upper portion has a back end 48 with a rectangular projection 52 and a front end integral the second intermediate. The rectangular projection has an opening therethrough. The second lower portion is at an angle to the second upper portion and has a length of about 6 inches. The second lower portion has a top end integral the second intermediate and a bottom end 54 with a fork projection 56 extending therefrom. The fork projection has two extents. Each extent of the fork has a horizontal aperture 58 therethrough. Each aperture of each extent of the fork is axial and collinear. The second intermediate 46 has a front side and a back side. The front side has a hooking portion 60.

The second lower portion 44 has a generally rectangular hole 64 spaced from the bottom end 54 and adjacent the second intermediate 46. The second lower portion has a longitudinal bore 66 therein. The longitudinal bore extends from the rectangular hole to pass out of the bottom end of the second lower portion. Also, included within the second lower portion is a spring stop 67 and a spring 69. The spring stop is adjacent the bottom end with the spring adjacent the spring stop. Adjacent the bottom end of the second lower portion and below the fork is a stopper 68. The stopper is positioned on the bottom end 54 to face the first lower portion 16 of the first jaw 12. The stopper is formed of rubber. The stopper prevents damage to the first lower portion of the first jaw when the device is activated. Further, the stopper prevents injury to careless operators. The rectangular projection 52 of the back end 48 of the second upper portion is coupled with a nut and bolt 72 to the rectangular projection of the front end 22 of the first upper portion 14. As illustrated in FIG. 5 the nut and bolt is positioned through the opening of each rectangular projection. The nut and bolt in coupling the first jaw to the second jaw does not restrict the movement of the jaws.

Figure 3:
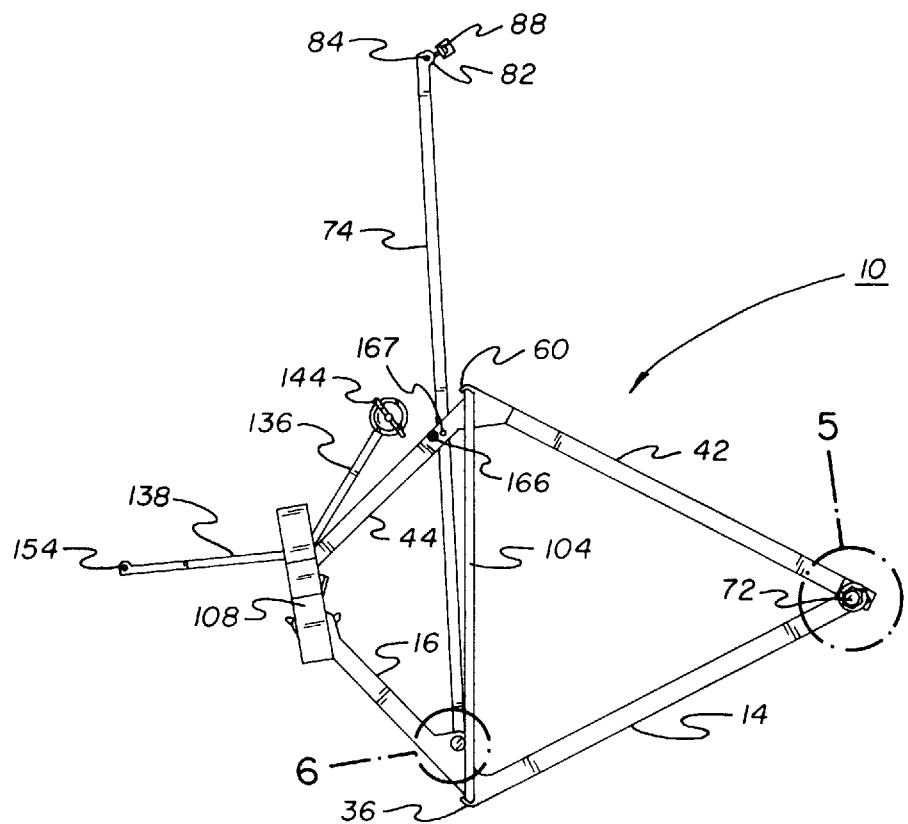
FIG. 3 is an elevated view of the present invention in an operable configuration after activation.
Figure 4:
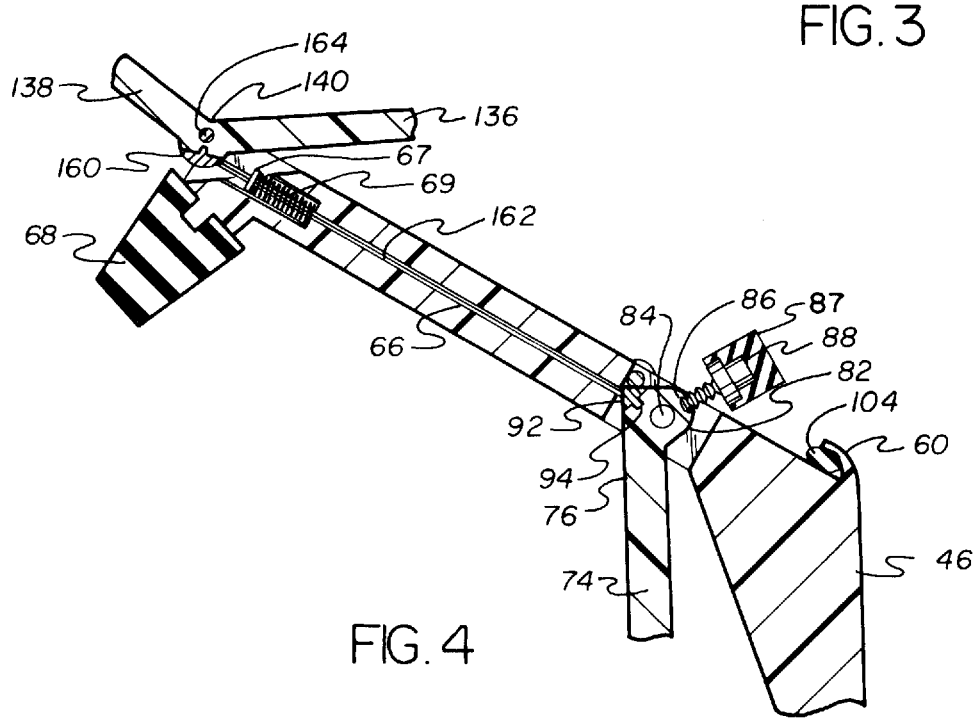
FIG. 4 is an enlarged sectional view of the present invention at position 4 of FIG. 2.

Also included, is a swing-arm 74, as shown in FIG. 2. The swing-arm has a front end 76, a rear end 78 and a length of about 22 inches from the front end to the rear end. The swing-arm is formed of high density plastic. The front end has a rounded projection 82 extending therefrom with an opening 84 therethrough, as shown in FIG. 3. The rounded projection of the swing-arm has a top side 86 with an end stop 88 therein and projecting outwardly therefrom, as shown in FIG. 4. The end stop has a rubber protector 87 encasing. The rubber protector aids in preventing injury when the swing-arm is released. The rounded projection of the swing-arm has a bearing surface 92 with a wear resistant insert 94 therein. The wear resistant insert is preferably a metal piece. The metal piece provides surface strength to the rounded projection. The rounded projection of the swing-arm is capable of resting within the rectangular hole 64 of the lower portion 44 of the second jaw 40. Specifically, the swing-arm rests on a steel pin 166 as shown in FIG. 3. The steel pin is mounted in bearings to improve sensitivity. As illustrated in FIG. 6, the rear end has a generally rectangular projection 98 with an opening 100 therethrough. The rectangular projection of the swing-arm is coupled by a rivet 102 to the rounded projection 32 of the front side of the first intermediate 18.

Included is a rubber band 104, as shown in FIG. 2. The rubber band is hooked to the hooking portion 36 and 60 of the first jaw and the second jaw. The rubber band provides a snap action when the lever of the device is moved.

Furthermore a clamp 108 is included. The clamp, as shown in FIG. 7, is formed of plastic or metal. The clamp has a mouth 112, a pair of grips 114 and 116 and a pivot pin with a bias member 118 therebetween. The mouth is capable of clasping onto a portion of a fishing rod 120 above a reel 122. One of the pair of grips 114 has a threaded opening 126 therethrough. The one grip is coupled to the rounded projection 28 of the first lower portion 16 with a ratchet mechanism 128. The ratchet mechanism may be replaced with a squeeze handle mechanism. The ratchet mechanism is positioned through the opening of the projection of the first lower portion and threaded through the opening 126 of the one grip 114. The ratchet mechanism allows the operator to set the angle of the device by lifting the second jaw to the desired angle and letting go. The ratchet mechanism allows the device to be rotated up but not down. As shown in FIG. 7, the space formed between the ratchet mechanism and the one grip has a stop gap 132. The stop gap is positioned to absorb the shock to the first jaw 12 when the second jaw 40 closes against it.

A lever 134 with a first portion 136, a second portion 138 and a joining point 140 therebetween is included. As shown in FIG. 1B, the first portion forms an obtuse angle with the second portion at the joining point. The first portion has a first end 142 with a wing nut 144 therethrough. The wing nut has a bolt 146 attached thereto. The second portion has a second end 152 with an eyelet 154 therethrough. The eyelet is structured so that an additional weight may be added to the lever if needed. The joining point has an opening therethrough. The lever is attached to the fork 56 of the second jaw 40. The bolt has a portion of a fishing line 158 placed thereon when the clamp 108 is attached to the fishing rod 120. The fishing line has a hook thereon.

Lastly, a cam 160 is provided. The cam is preferably formed of metal and provides a bearing surface. The cam is positioned between the fork 56 of the second jaw and adjacent the opening of the joining point 140 of the lever. The cam has extending therefrom a rod 162 that is pushed by the bearing surface of the cam. The rod is attached to the spring stop 67 and is passed through the central axis of the spring 69 before passing into the bore 66 of the second jaw 40. The rod passes through the bore when the cam is positioned between the fork. The cam is secured within the fork with a pivot pin 164 as shown in FIG. 4. The rod is capable of being positioned against the bearing surface of the metal piece 94 of the swing-arm 74 for pushing the swing-arm out of the second jaw. The spring provides the tension needed to keep the rod in contact with the cam at all times. The cam is capable of moving the rod in a downward motion for release of the swing-arm when the lever is pulled forward. The lever is pulled forward when a fish pulls the fishing line positioned over the bolt. As best illustrated in FIG. 3, the swing-arm is released and retracts by the force of the rubber band, this causes the second jaw to move toward the first jaw thereby pulling the fish hook into the fish as the fish line is pulled by the device.

Regarding FIG. 8, the locking pin is 165. The locking pin prevents the device from going off when positioned within the pair of apertures 167 of the second lower portion of the second jaw 40. The apertures 167 are just above the steel pin 166 of the second lower portion of the second jaw, as shown in FIG. 3. Each aperture 167 of the second lower portion is spaced from the second intermediate 46. Each aperture 167 of the second lower portion passes through the rectangular hole 64 along a horizontal axis. The locking pin is positioned through each aperture 167 of the second lower portion and through the opening 84 in the projection 82 of the swing-arm 74. Placement of the locking pin occurs when the swing-arm is positioned in the rectangular hole of the second lower portion of the second jaw. The locking pin prevents the rod from releasing the swing-arm when the device is being set.

The steel pin 166 is positioned through the second lower portion and spaced from the second intermediate 46. The steel pin passes through the rectangular hole 64 along a horizontal axis. The steel pin holds the swing-arm up and over the steel pin.

The present invention is an improved fishing device that has two jaws being rotatably coupled and a swing-arm. The swing-arm is positioned between a portion of the second jaw and attached to the first jaw. The swing-arm is controlled by a lever that is attached to the second jaw. The lever is coupled with a cam at the fork of the second jaw. The cam has a rod that extends through a bore in the lower portion of the second jaw. A pin holds the swing-arm in position within the second jaw until the lever is moved. The improved fishing device is clamped to a fishing rod just above the reel. The improved fishing device may be clamped as shown in FIG. 1A. The device, when clamped at a 90 degree angle with the fishing rod, has the fishing line passing through all of the line eyelets on the fishing rod. When the device is at this angle the tension on the fishing line is increased by a significant amount. An increase in the tension of the fishing line will cause the device to have a snap action more readily. The line of the fishing rod, in FIGS. 1A or 1B, is strung across a bolt connected to the first end of the lever.

When the fish bites, the lever with the attached line is rotated outwardly. The rotation of the lever causes the cam to slowly push the rod inwardly. The rod pushes the swing-arm up allowing the swing-arm to be pushed forward and out of the rectangular hole. The retraction of the rubber band forces the swing-arm forward. With the swing-arm no longer engaged, the second jaw rapidly snaps toward the first jaw, setting the hook in the fish.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved fishing device for setting a hook into a fish comprising, in combination:

a first jaw having a first upper portion, a first lower portion and a first intermediate, the first upper portion having a length of about 1 foot, the first upper portion having a front end with a rectangular projection and a back end integral the intermediate, the rectangular projection having an opening therethrough, the first lower portion being at an angle to the first upper portion and having a length of about 6 inches, the first lower portion having a top end integral the first intermediate and a bottom end with a rounded projection extending therefrom, the rounded projection having an opening therethrough, the first intermediate having a front side and a back side, the front side having a rounded projection with an opening therein extending outwardly and the back side having a hooking portion;

a second jaw having a second upper portion, a second lower portion and a second intermediate, the second upper portion having a length of about 1 foot, the second upper portion having a back end with a rectangular projection and a front end integral the second intermediate, the rectangular projection having an opening therethrough, the second lower portion being at an angle to the second upper portion and having a length of about 6 inches, the second lower portion having a top end integral the second intermediate and a bottom end with a fork projection extending therefrom, the fork projection having two extents with each extent of the fork having a horizontal aperture therethrough, each aperture of each extent of the fork being axial and collinear, the second intermediate having a front side and a back side, the front side having a hooking portion;

the second lower portion having a generally rectangular hole spaced from the bottom end of the second lower portion and adjacent the second intermediate, the second lower portion having a longitudinal bore therein, the bore extending from the rectangular hole passing out of the bottom end of the second lower portion, the second lower portion further having a spring stop and a spring therein, the spring stop being positioned adjacent the bottom end with the spring adjacent the spring stop, the bore extending from the bottom end into the hole, the rectangular projection of the back of the second upper portion being coupled with a nut and bolt to the rectangular projection of the front end of the first upper portion, the nut and bolt being positioned through the opening of each rectangular projection, a swing-arm having a front end, a rear end and a length of about 22 inches from the front end to the rear end, the front end having a rounded projection extending therefrom with an opening therethrough, the rounded projection of the swing-arm having a top side with an end stop therein and projecting outwardly therefrom, the end stop having a rubber protector thereon, the rounded projection of the swing-arm having a bottom side with a wear resistant insert therein, the rounded projection of the swing-arm being capable of resting within the rectangular hole of the lower portion of the second jaw, the rear end having a generally rectangular projection of the swing-arm being coupled by a rivet to the rounded projection of the front side of the first intermediate;

a rubber band being hooked to the hooking portions of the first jaw and the second jaw;

a clamp having a mouth, a pair of grips and a pivot pin with a bias member therebetween, the mouth capable of clasping onto a portion of a fishing rod above a reel, one of the pair of grips having a threaded opening therethrough, the one grip being coupled to the rounded projection of the first lower portion with a ratchet mechanism, the ratchet mechanism being positioned through the opening of the projection of the first lower portion and threaded through the opening of the one grip;

a lever having a first portion, a second portion and a joining point therebetween, the first portion forming an obtuse angle with the second portion at the joining point, the first portion having a first end with a wing nut therethrough, the wing nut having a bolt attached thereto, the second portion having a second end with an eyelet therethrough, the joining point having an opening therethrough, the lever capable of being attached to the fork of the second jaw, the bolt capable of having a portion of a fishing line placed thereon when the clamp being attached to a fishing rod, the fishing line having a hook thereon; and a cam being positionable between the fork of the second lower portion and adjacent the opening of the joining point of the lever, the cam having extending therefrom a rod, the rod being attached to the spring stop and passing through the spring for positioning within the bore of the second jaw when the cam being positioned between the fork, the cam being secured within the fork with a pivot pin, the cam being capable of moving the rod in a downward motion for release of the swing-arm when the lever is pulled forward by a fish pulling the fishing line positioned over the bolt, the swing-arm being released retracts the rubber band forcing the second jaw to move toward the first jaw thereby pulling the fish hook into the fish as the fishing line is pulled by the device.

2. The improved fishing device comprising:

a first jaw having a first upper portion with a projection, a first lower portion with a projection and a first intermediate with a projection and a hooking portion, the first intermediate being integral the first upper portion and the first lower portion, each projection having an opening therethrough;

a second jaw having a second upper portion with a projection, a second lower portion with a fork projection having apertures therethrough and a second intermediate with a hooking portion, the second intermediate being integral the second upper portion and the second lower portion, each projection having an opening therethrough, the second upper portion capable of coupling with the first upper portion;

the second lower portion having a hole adjacent the second intermediate therethrough and a bore within;

a swing-arm having a front end being positioned within the second jaw and a rear end coupled to the first jaw;

a rubber band attached to each hooking portion;

a clamp coupled to the first lower portion of the first jaw and a fishing rod;

a lever having a first portion with a bolt attached being capable of having a fishing line placed thereon and a joining point for attaching to the fork; and a cam having a rod for positioning within the bore, the cam being positioned within the fork, the rod capable of moving the swing-arm from within the second jaw when the cam being rotated forward.

3. The improved fishing device as set forth in claim 2 wherein the first upper portion having a length of about 1 foot and a front end having the projection thereon.

4. The improved fishing device as set forth in claim 2 wherein the first lower portion having a length of about 6 inches, and vertical the first upper portion with bottom end with the projection extending therefrom.

5. The improved fishing,device as set forth in claim 2 wherein the first intermediate having a front side with the projection extending therefrom and a back side having the hooking portion.

6. The improved fishing device as set forth in claim 2 wherein the second upper portion having a length of about 1 foot and a back end having the projection thereon, the back end being coupled with a front end of the first upper portion by a nut and bolt.

7. The improved fishing device as set forth in claim 2 wherein the second lower portion having a length of about 6 inches, and vertical the second upper portion with a bottom end having the fork projection.

8. The improved fishing device as set forth in claim 7 wherein the fork projection having two extents and each aperture passing through each extent along a horizontal axis.

9. The improved fishing device as set forth in claim 2 wherein the bore being vertical and extends from the fork to the hole of the second lower portion.

10. The improved fishing device as set forth in claim 2 wherein the swing-arm having a length of about 22 inches, the front end having a rounded projection with an opening, a top side with an end stop and a bottom side with a wear resistant insert therein, the rear end having a rectangular projection with an opening and coupled to the projection of the first intermediate with a rivet.

11. The improved fishing device as set forth in claim 2 wherein the clamp having a mouth for clasping a portion of a fishing rod and a pair of grips, one of the grips being attached to the projection of the first lower portion with a ratchet mechanism.

12. The improved fishing device as set forth in claim 2 wherein the lever having a second portion forming an obtuse angle with the first portion and a second end with an eyelet therethrough, and the bolt of the first portion having a wing nut coupling it to a first end of the first portion.

13. The improved fishing device as set forth in claim 10 wherein the swing-arm rests against a rotatably mounted pin for retaining the swing-arm within the second jaw.

14. The improved fishing device as set forth in claim 2 wherein the cam further being capable of moving the rod in a downward direction when a fish pulls on a fishing line positioned across the lever.

15. The improved fishing device as set forth in claim 2 wherein a stopper being positioned on the second lower portion and a stop gap being positioned on the first lower portion between the clamp and the projection thereof, the stopper capable of engaging the stop gap when the swing-arm being released by the movement of the rod.

* * * * *